(12) United States Patent
Cook et al.

(10) Patent No.: US 6,907,906 B1
(45) Date of Patent: Jun. 21, 2005

(54) CUFFED HOSE AND METHOD OF MANUFACTURE

(75) Inventors: Andre Georges Cook, Quebec (CA); Jacques Bernard Emond, Granby (CA); Pascal Langlois, Granby (CA)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/070,983

(22) PCT Filed: Oct. 20, 1999

(86) PCT No.: PCT/US99/24649

§ 371 (c)(1),
(2), (4) Date: Mar. 8, 2002

(87) PCT Pub. No.: WO01/29774

PCT Pub. Date: Apr. 26, 2001

(51) Int. Cl.[7] ............................................. F16L 11/10
(52) U.S. Cl. ................... 138/109; 138/121; 138/122; 138/172; 138/173; 138/144
(58) Field of Search ............................... 138/121, 122, 138/109, 173, 172, DIG. 8, 134, 129, 177, 138/178, 144, 143, 110

(56) References Cited

U.S. PATENT DOCUMENTS

| | | | | |
|---|---|---|---|---|
| 289,381 A | * | 12/1883 | Bodifield | 138/110 |
| 289,854 A | * | 12/1883 | Perry | 138/134 |
| 325,591 A | * | 9/1885 | Coultaus | 138/134 |
| 726,730 A | * | 4/1903 | McGuire | 138/134 |
| 1,249,038 A | * | 12/1917 | Dabney | 138/110 |
| 1,551,893 A | * | 9/1925 | McDonald | 141/382 |
| 1,746,719 A | * | 2/1930 | Sneed | 74/502.5 |
| 1,748,774 A | * | 2/1930 | Kellogg et al. | 285/148.23 |
| 1,779,592 A | * | 10/1930 | Goodall | 138/134 |
| 1,816,740 A | * | 7/1931 | Ogren | 138/134 |
| 2,032,753 A | | 3/1936 | James | 138/61 |
| 3,640,312 A | | 2/1972 | Bauman et al. | 138/121 |
| 3,794,080 A | * | 2/1974 | Huston et al. | 138/121 |
| 3,847,184 A | * | 11/1974 | God | 138/120 |
| 3,938,929 A | | 2/1976 | Stent et al. | 425/501 |
| 4,012,272 A | | 3/1977 | Tiner | 156/429 |
| 4,099,744 A | | 7/1978 | Kutnyak et al. | 285/7 |
| 4,196,031 A | | 4/1980 | Lalikos et al. | 156/143 |
| 4,236,509 A | * | 12/1980 | Takahashi et al. | 600/139 |
| 4,295,496 A | | 10/1981 | Bixby | 138/122 |
| 4,304,266 A | | 12/1981 | Kutnyak et al. | 138/129 |
| 4,383,555 A | | 5/1983 | Finley | 138/129 |

(Continued)

FOREIGN PATENT DOCUMENTS

EP          0330894          2/1989    ........... F16L 33/26

(Continued)

Primary Examiner—Patrick Brinson
(74) Attorney, Agent, or Firm—Nancy T. Krawczyk

(57) ABSTRACT

The present invention is directed towards an improved flexible hose (10). The hose (10) is comprised of at least a flexible material (28) and a reinforcing rod (12) positioned externally of the flexible material (28). Terminal ends (16, 18) define both the flexible material (28) and the reinforcing rod (12). At least one terminal end (16) of the reinforcing rod (12) is located short of the terminal ends (18) of the flexible material (28), so that the non-reinforced end of the flexible material (28) forms a soft cuff (20) adapted to be received by a hose fitting. Also disclosed is an improved method of manufacturing the flexible hose (10).

2 Claims, 4 Drawing Sheets

U.S. PATENT DOCUMENTS

| | | | | |
|---|---|---|---|---|
| 4,456,034 A | 6/1984 | Bixby | | 138/122 |
| 4,471,813 A | 9/1984 | Cothran | | 138/122 |
| 4,578,855 A * | 4/1986 | Van Der Hagen | | 29/447 |
| 4,669,508 A | 6/1987 | Neaves | | 138/121 |
| 4,722,367 A * | 2/1988 | Swink et al. | | 138/178 |
| 4,852,564 A * | 8/1989 | Sheridan et al. | | 128/202.27 |
| 4,856,720 A | 8/1989 | Deregibus | | 242/7.02 |
| 4,966,202 A | 10/1990 | Bryan et al. | | 138/172 |
| 4,966,741 A | 10/1990 | Rush et al. | | 264/154 |
| 4,971,121 A * | 11/1990 | Guertin | | 141/392 |
| 5,398,977 A | 3/1995 | Berger et al. | | 285/133.1 |
| 5,482,089 A * | 1/1996 | Weber et al. | | 138/122 |
| 5,485,870 A | 1/1996 | Kraik | | 138/122 |
| 5,497,810 A | 3/1996 | Berger et al. | | 138/113 |
| 5,899,237 A * | 5/1999 | Akedo et al. | | 138/129 |
| 5,938,587 A * | 8/1999 | Taylor et al. | | 600/139 |
| 6,315,715 B1 * | 11/2001 | Taylor et al. | | 600/140 |

FOREIGN PATENT DOCUMENTS

| | | | | |
|---|---|---|---|---|
| EP | 0449395 | 1/1991 | | F16L 11/115 |
| FR | 1467950 | 4/1967 | | |
| FR | 2472407 | 7/1981 | | B01D 46/04 |
| GB | 1239387 | 7/1971 | | F16I 11/08 |
| GB | 2303574 | 2/1997 | | B29C 35/02 |
| WO | WO9703815 | 2/1997 | | B29D 23/00 |
| WO | WO9724543 | 7/1997 | | F16L 11/08 |

\* cited by examiner

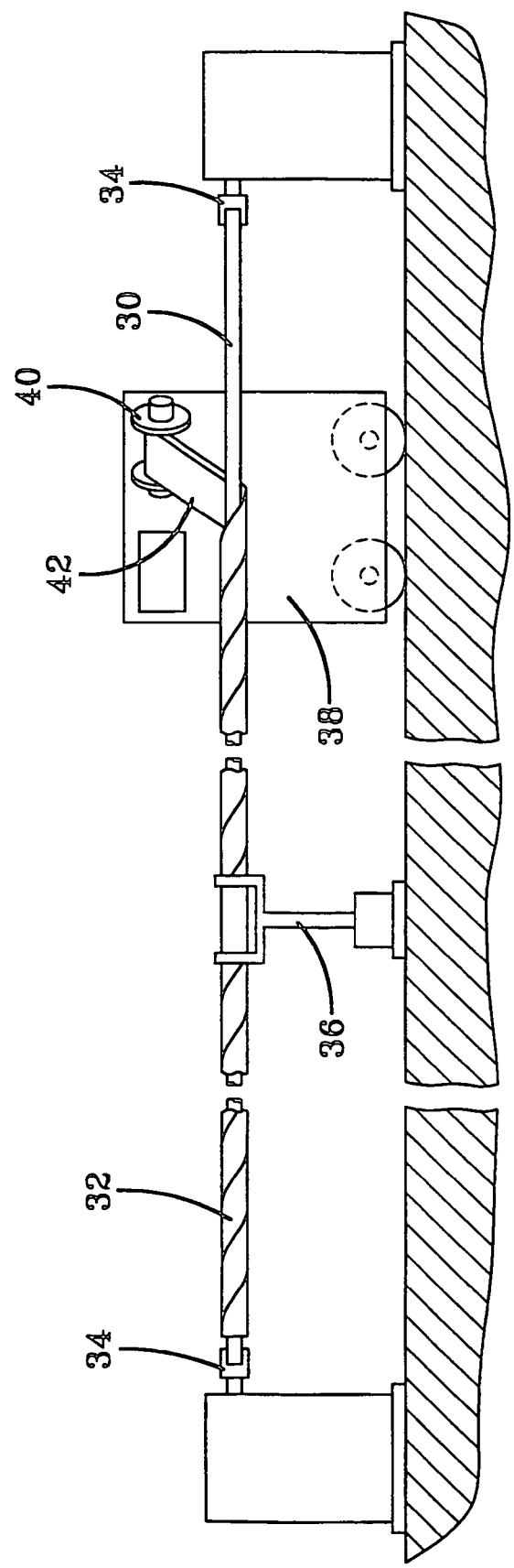

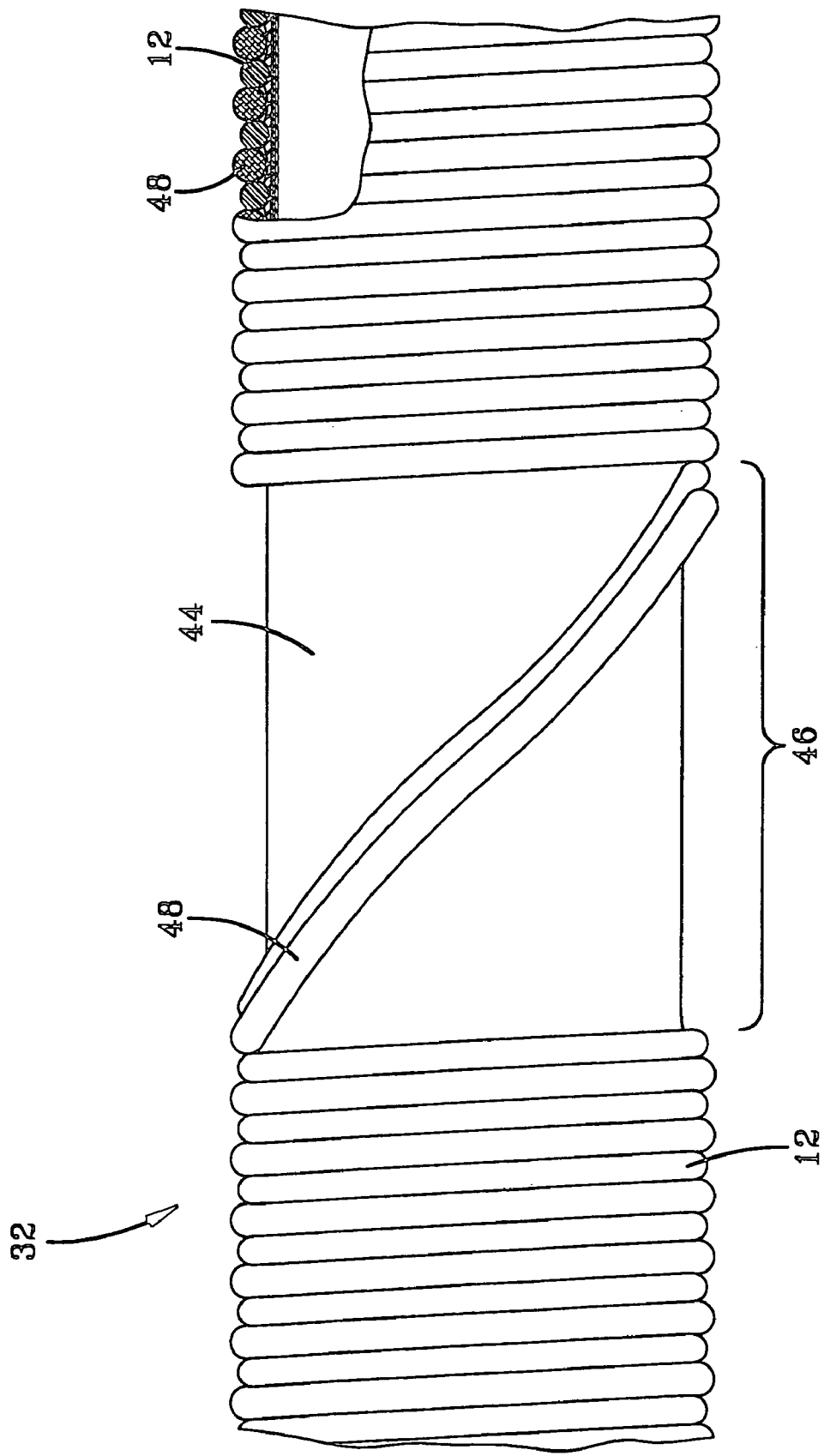

CUFFED HOSE AND METHOD OF MANUFACTURE

TECHNICAL FIELD

The present invention relates to composite hoses, more particularly to rubber and plastic hoses comprising an outer helically extending reinforcement layer. The hose is constructed to provide for easier coupling of the hose ends and any desired fittings.

BACKGROUND ART

Hoses manufactured with outer helical PVC, nylon, or other plastic-like polymer rod reinforcements are known in the art. Such hoses are also known as drop hoses. Drop hoses are mainly used for the transfer of various fluids, such as gasoline, petroleum based products, chemicals, food products, etc., in tank truck applications. Drop hoses, and similar corrugated hoses, are made by several different manufacturing methods, including those disclosed by U.S. Pat. Nos. 4,383,555, 4,471,813, 4,304,266, 4,012,272, and 3,938,929 and disclosed in WO97/24543. The hose ends are generally later coupled with cam and groove fittings and band clamps.

Because of the need for a tight fit between a fitting and the hose, the outside diameter of a fitting shank and the inside diameter of the hose are almost identical; the shank is usually a bit larger than the hose ID. The slightly larger shank OD results in deformation of those portions of the hose that are in contact with the shank. Thus a certain force is required to insert the fitting shank into the hose. The force required to insert the shank into the hose increases if the hose is reinforced with a rigid, non-deformable material such as the outer helical PVC rod. To provide the necessary force or to reduce the required force, it is known in the art to apply lubricants to hose, to attempt to soft the PVC prior to insertion in the hose, or apply greater force to the fitting to ensure a proper insertion. All of these methods are time and labor consuming and may be detrimental to the hose or the fitting.

The configuration of the outer corrugations can also make the insertion of the fittings into the hose bore difficult and make it difficult to install the band clamps over the plastic spiral wire and achieve a leak proof connection without band distortion and damage to the hose or fitting. Over the years, aids have been developed to overcome these situations. One such aid is to place a piece of rope between the outer corrugations of the cover to achieve a flat surface at each end of the hose that will make it easier to install the band clamps and prevent distortion. Another aid is the use of a "banding coil." A banding coil is a separate spring or coil made out of a plastic-like material that is either screwed or wrapped on the cover and fills the corrugations created by the outer helical wire at each end of the hose. The result achieved by the banding coil is the same as the rope, which is to end up with a flatter surface to install the band clamps. Another aid is the use of a rubber-like sleeve that is slipped over the ends of the hose that also attempts to create a flatter surface.

The present invention of forming a drop hose with soft cuffed ends eliminates the known problem in the art and eliminates the use of external aids as described above in coupling this type of hose. Many other advantages also arise from the present invention, including easier insertion of the fitting into the hose, reduced labor in coupling the hose, better coupling retention, and a likely reduction of necessary inventory for hose distributors.

Corrugated rubber or plastic hose with cuffed ends are disclosed in the following patents. U.S. Pat. No. 4,099,744 discloses a hose end formed flat with no corrugations. U.S. Pat. No. 5,398,977, U.S. Pat. No. 5,497,810, and EP 330894 disclose a plastic cuff inserted over the corrugations. U.S. Pat. No. 3,640,312, discloses an extruded hose end formed without corrugations and U.S. Pat. No. 4,456,034, U.S. Pat. No. 4,996,741, U.S. Pat. No. 4,996,20, U.S. Pat. No. 4,295,496, and U.S. Pat. No. 4,669,508 all disclose extruded or rubber corrugated hoses with non-corrugated ends which are internally reinforced by helically extending wires placed within the extruded or preformed corrugations. However, the corrugations of these hoses are formed by the extruded layers or by internal helical means, differing from the external helical reinforcing means of the conventional drop hoses. It is the presence of the external helical reinforcing means of the drop hoses which has created the need for the external aids and high force required to apply fittings to the drop hoses.

However, in the drop hose of the present invention, the corrugations are solely formed by the helically extending outer reinforcement, and the base hose material has a constant internal diameter. While forming cuffs on hose ends is known in the art and the need for a constant outer diameter at the end of drop hoses to provide the hose with fittings has long been recognized in the art, as evidenced by the numerous types of aids used with conventional drop hose ends, forming a drop hose with cuffed ends in the manner of the present invention has not been appreciated or recognized. The present invention is directed toward a solution of a long felt problem in the art and provides the many benefits listed above.

SUMMARY OF THE INVENTION

The present invention is directed towards an improved flexible hose. The hose is comprised of at least a flexible material and a reinforcing rod positioned externally of the flexible material. Terminal ends define both the flexible material and the reinforcing rod. At least one terminal end of the reinforcing rod is located short of the terminal ends of the flexible material, so that the non-reinforced end of the flexible material forms a soft cuff adapted to be received by a hose fitting.

Also disclosed is an improved method of manufacturing the flexible hose of the present invention. The hose is formed by rotating a mandrel while feeding a length of material onto the mandrel to build a hose length on the mandrel, feeding a second length of material in the form of a reinforcing rod onto the mandrel to form a helical reinforcing rod on the hose length and curing the hose length. The improvement in the method of forming the inventive hose is characterized by, prior to feeding the reinforcing rod onto the mandrel, modifying the hose length to create non-adhesive regions.

Another aspect of manufacturing the inventive hose includes applying a third material to the hose length to create the non-adhesive regions.

Another aspect of manufacturing the inventive hose lies in the method of applying the reinforcing rod onto the mandrel in the locations of the non-adhesive region. The speed at which the mandrel rotates as the reinforcing rod is feed onto the mandrel at the non-adhesive regions may be reduced, creating a winding with a greater pitch in the non-adhesive regions. Or the tension of the reinforcing rod may be reduced as the reinforcing rod is feed onto the mandrel at the non-adhesive regions.

Also disclosed is a hose length. The hose length is comprised of at least one elastomeric layer and a reinforcing rod helically wound externally of the elastomeric layer. Periodically spaced along the hose length are non-adhesive regions.

Another aspect of the disclosed hose length is that the reinforcing rod is not adhered to the elastomeric layer in the non-adhesive region.

Another aspect of disclosed hose length lies in the application of the reinforcing rod on the elastomeric layer in the locations of the non-adhesive region. The reinforcing rod may be wound onto the elastomeric layer with a reduced pitch than in the adhesive regions. Or the tension of the reinforcing rod may be reduced in the non-adhesive regions.

BRIEF DESCRIPTION OF DRAWINGS

The invention will be described by way of example and with reference to the accompanying drawings in which:

FIG. 3 illustrates the method of manufacturing the inventive hose;

FIG. 4 illustrates a portion of the hose during manufacture.

DETAILED DESCRIPTION OF THE INVENTION

Figure 1:
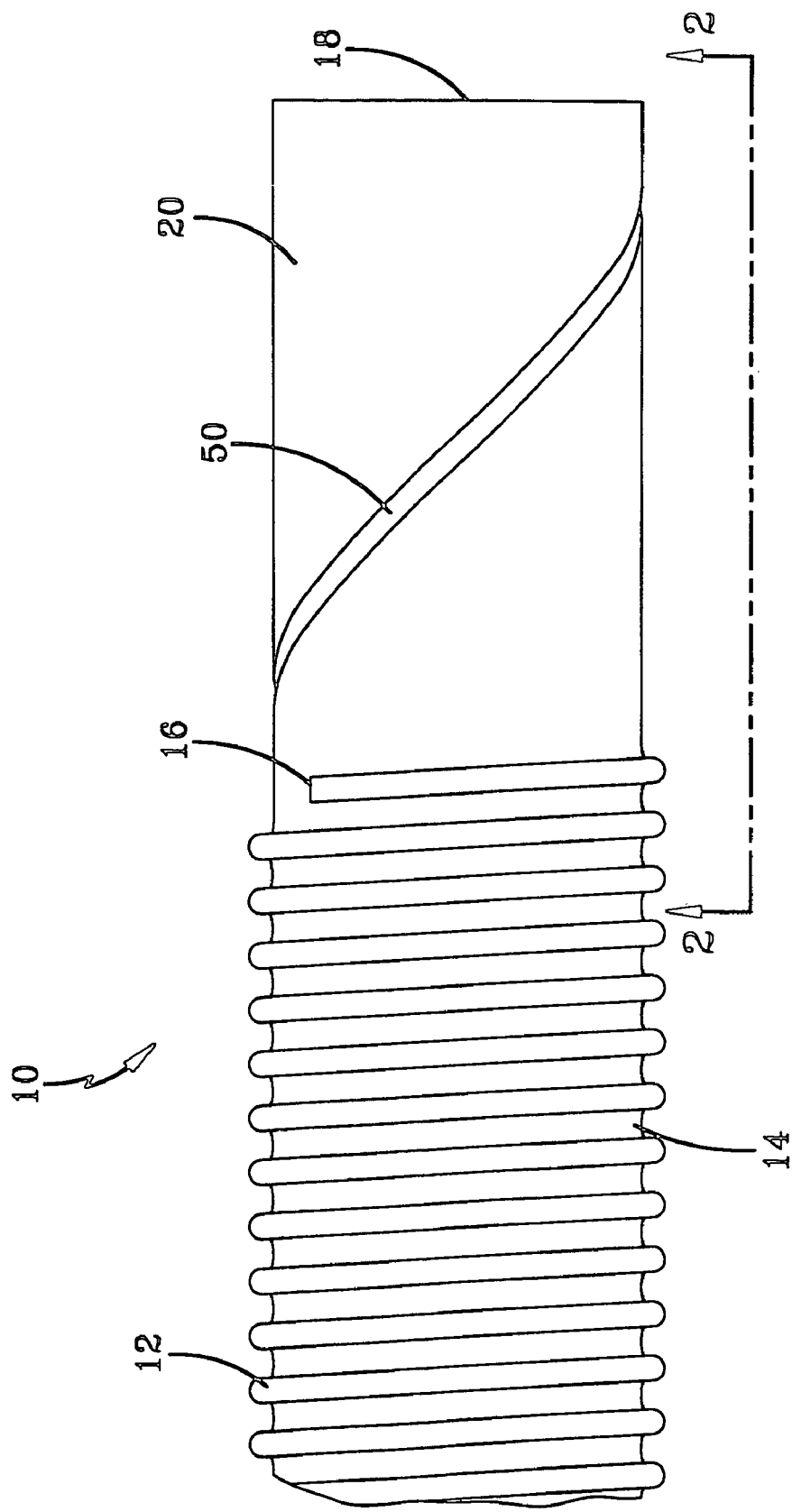
FIG. 1 illustrates the inventive hose.

The hose 10 of the present invention is illustrated in FIG. 1. The hose 10 has an external reinforcing rod 12 helically wound about a flexible hose base 14. The reinforcing rod 12 has a terminal end 16 located a distance from the terminal end 18 of the hose base 14, creating a soft hose cuff 20. The hose 10 has a constant internal diameter (see FIG. 2), and a minimum and maximum outer diameter created by the corrugation effect of the reinforcing rod 12 and the flexible hose base 14 between the windings of the reinforcing rod 12. Since the soft cuff 20 is an extension of the flexible hose base 14, the cuff 20 has an outer diameter corresponding to the minimum outer diameter of the hose 10.

Figure 2:
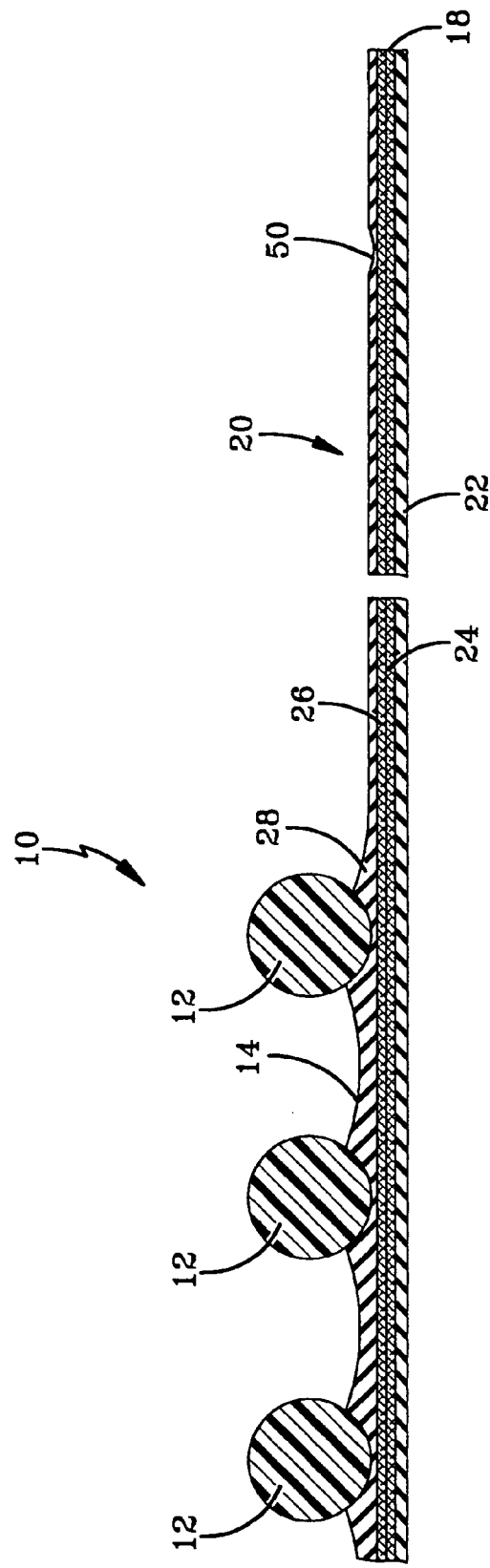
FIG. 2 is a cross-sectional view of the hose.

An exemplary construction of the hose 10 is illustrated in the cross-sectional view of FIG. 2. The flexible hose base 14 is constructed from a base layer 22, two reinforcing plies 24, 26 and an outer cover layer 28. The hose base 14 may be provided with a number of layers differing from the illustrated two reinforcing layers 24, 26 and other rubber layers in addition to the base layer 22. The number and type of layers comprising the flexible hose base 14 is dependant upon the desired hose properties as determined by the end use of the hose 10.

The base layer 22 is constructed of conventional natural or synthetic thermoelastic vulcanizable material used in the manufacture of hoses. The reinforcing layers 24, 26 are also formed of conventional hose reinforcing materials. The cover layer 28 is formed from a thermoplastic or thermoelastic vulcanizable material that is capable of bonding to the base layer 22 and to the reinforcing rod 12 during curing of the hose 10. Examples of typical materials for the base and cover layers 22, 28 include, but are not limited to, nitrile rubber for the base layer 22 and a nitrile rubber/PVC blend for the cover layer 28. The reinforcing rod 12 is formed from a material that is more rigid and/or has a higher mechanical strength than the cover layer 28, such as polyvinylchloride. The reinforcing rod 12 may also have an internal reinforcing wire.

The manufacture of the hose 10 is achieved by spirally winding the various hose layers 12, 22, 24, 26, 28, onto a mandrel 30, see FIG. 3, to produce a hose length 32 which is then cut into short lengths to produce the inventive soft-cuff hose 10. More details concerning one method of manufacturing the hose length 32 are disclosed in U.S. Pat. No. 4,856,720, which is incorporated herein by reference. In this method of manufacturing, the hose length 32 is built upon a long, straight circular mandrel 30 that is fixed to rotating drives 34 at each end of the mandrel 30. The mandrel 30 is supported by roller bearings 36 at approximately every fifteen feet. Parallel to the mandrel 30 is a trolley 38 equipped with material applicators 40. The material applicators 40 are bobbins provided with the different materials 42 used in the manufacture of the hose length 32, including rubber, fabric, wire helix, PVC rod, curing tape, and rope.

The materials 42 used to construct the hose length 32 are applied spirally onto the rotating mandrel 30 as the trolley 38 moves parallel to the mandrel 30. The hose length 32 is constructed in this manner by applying one layer of material 42 over the proceeding layer. Usually the trolley 38 will apply a layer in a first direction and the next layer in the opposite direction for symmetry and design purposes. For the illustrated hose length 32, the base rubber layer 22 is first applied to the rotating mandrel 30, followed by the reinforcing layers 24, 26, and then the cover layer 28. At this point in the construction of the hose length 32, a basic softwall rubber hose has been constructed on the mandrel.

To transform the softwall rubber hose length 32 into the helically reinforced, soft cuffed hose 10 of the present invention the following further steps are taken. At pre-selected regions 46 along the softwall rubber hose length 32, a material 44 is applied to render the pre-selected region non-adhesive to further layers applied to the hose length 32 in the pre-selected region. The pre-selected positions 46 along the hose length 32 are at locations corresponding to the lengths of the individual hoses 10 to be produced. For example, if twenty foot hoses 10 (including the cuffed ends) with six inch cuffs 20 at each terminal end are desired, a pre-selected non-adhesive region 46 is prepared along the hose length 32 for a length of twelve inches every nineteen feet. So for the entire mandrel length, the first six inches of the hose length 32 is rendered non-adhesive and then the trolley 38, applying a non-adhesive material 44, is moved nineteen feet further along the mandrel 30 from the position of the first non-adhesive region 46. The non-adhesive material 44 is then applied to the softwall rubber hose length 32 for a length of twelve inches to produce two six inch cuffs 20. The steps of moving the trolley 38 nineteen feet and applying twelve inches of non-adhesive material 44 is repeated along the length of the mandrel 30. The non-adhesive material 44 may be formed from any non-adhesive material that prohibits the outer rubber layer 28 from curing to the reinforcing rod 12. Such materials include, but are not limited to, nylon tape, film, or sheets, polyester tape, film or sheets, pre-cured rubber tape, film, or sheets, metallic film or sheets, Teflon film or sheets, or a liquid non-adhesion material.

After the non-adhesive material 44 is applied in the pre-selected positions, using the trolley 38, the reinforcing rod 12 is applied to the rotating mandrel 30 and onto the softwall rubber hose length 32. The reinforcing rod 12 is applied with a constant pitch except over the pre-selected region 46 where the non-adhesive material 44 has been applied, see FIG. 4. As the trolley 38 moves past the pre-selected regions 46 where the non-adhesive material 44 is applied, the speed at which the mandrel 30 rotates is reduced, while the trolley speed is maintained, thus increasing the pitch at which the rod 12 is applied to the mandrel 30. As illustrated, the hose length 32 on the mandrel 40 has a variably pitched reinforcing rod 12.

After the variably pitched reinforcing rod 12 has been applied, a rope 48 is inserted in the spaces formed between the windings of the rod 12. The rope 48 is applied in the same manner as the reinforcing rod 12, with an increased pitch at the pre-selected areas 46 where a soft cuff 20 is to be formed on the finished hose 10. The diameter of the rope 48 is sized to maintain the desired pitching of the reinforcing rod 12 on the hose length 32. The rope 48 also acts as a mold to hold the hose layers 22, 24, 26, 28 and the rod 12 in place during the curing of the hose length 32. The rope 48 selected may be a conventional braided rope or a smooth rope; any conventional non-adhesive, flexible cord-type material may be used.

The hose length 32 is cured to vulcanize the layers 12, 22, 24, 26, 28 and create adhesion between the various layers 12, 22, 24, 26, 28, including between the reinforcing rod 12 and the hose cover layer 28. The rod 12 adheres to the cover layer 28 along the hose length 32, except where the non-adhesive material 44 has been applied. After the hose length 32 has been cured, the rope 48 is removed. After being removed from the mandrel 30, the hose length 32 is then cut into the desired final hose lengths. Preferably, the cuts are centered in the pre-selected regions 46 to produce two soft cuffs 20. The cuts may also be at one of the edges of the pre-selected region 46 if it is desired to form a hose 10 with only a single cuffed end 30. The portion of the reinforcing rod 12 that is not bonded to the outer cover layer 28 due to the presence of the non-adhesive material 44 is also removed. As a final step, if required, the non-adhesive material 44 is removed from the hose cuffs 20.

Due to the curing of the hose length 32 with the rope 48 being wound between the pitched helical windings of the reinforcing rod 12, and the tension force used to wind the rope 48 onto the mandrel 30, the flexible hose base 14 creates an indented imprint between the windings of the rod 12. The imprint from the rope 48 also extends into the soft cuff 20, creating a slight indent 50 in the soft cuff 30. The imprint indent 50 in the cuff 30 does not adversely affect the seal needed in applying a fitting to the hose cuff 30. If the rope 48 has a braided or textured pattern, then the indented imprint will be also have a braided or textured pattern.

As noted above, the hose 10 is manufactured by spirally winding the hose layers 12, 22, 24, 26, 28, onto a mandrel 30 to produce a hose length 32 which is then cut into short lengths with at least one soft cuffed end 30. The hose layers 12, 22, 24, 26, 28 may be applied to the mandrel 30 by means other than the illustrated traveling trolley 38 and material applicator 40. The layers 12, 22, 24, 26, 28 may be applied by moving a rotating mandrel 30 past a stationary material applicator 40. The layers 12, 22, 24, 26, 28 may also be applied by helically hand-winding the material 42 onto either a rotating or stationary mandrel 30.

Additionally, after the pre-selected region 46 has been modified to render that portion of the hose length 32 non-adhesive, the reinforcing rod 12 and supporting rope 48 may be applied by methods other than varying the pitch of the rod 12 and the rope 48. The reinforcing rod 12 may be applied at a constant pitch for the entire hose length 32, but with a reduced tension in the pre-selected non-adhesive regions 46. The rope 48, likewise, would then be applied at a constant pitch but with reduced tension in the pre-selected regions. The reduced tension of the rod 12 and rope 48 prevent the creation of multiple indents in the created soft cuff 20.

Since the inventive hose 10 has a terminal end 18 defined by a substantially constant inside and outside diameter for a defined length, it is easier to install any desired fittings to the cuffed hose end without the difficulties experienced with non-cuffed hoses and without needing to use known fitting aids as previously discussed.

What is claimed is:

1. A flexible hose (10) comprising a flexible material (14), the flexible material (14) comprising multiple layers and a reinforcing rod (12) positioned externally of the outermost layer of the flexible material (14) and bonded to the outermost layer of the flexible material (14), the flexible material (14) being formed with terminal ends (18), the improvement being characterized by:

the reinforcing rod (12) having at least one terminal end (16) being located short of the terminal ends (18) of the flexible material (14), the flexible material (14) thus becoming a soft cuff (20) adapted to be received by a hose fitting, the hose having a minimum and a maximum outer diameter, the maximum outer diameter created by the reinforcing rod, and the hose having an imprinted indent (50) extending through the length of the soft cuff (20).

2. A flexible hose (10) in accordance with claim 1, wherein the reinforcing rod (12) is wound at a pitch externally of the flexible material (14) and the indent (50) is wound at a pitch greater than the pitch of the reinforcing rod (12).

\* \* \* \* \*